United States Patent [19]
Himuro et al.

[11] Patent Number: 4,663,588
[45] Date of Patent: May 5, 1987

[54] DETECTOR FOR USE FOR MEASURING DIMENSIONS OF AN OBJECT

[75] Inventors: Kiyoshi Himuro, Yokohama; Akihisa Narimatsu, Naka; Katsutoshi Mibu, Kamagays; Takamoto Yoshioka, Tokyo, all of Japan

[73] Assignee: Sony Magnescale Incorporation, Tokyo, Japan

[21] Appl. No.: 634,791

[22] Filed: Jul. 26, 1984

[30] Foreign Application Priority Data

Jul. 27, 1983 [JP] Japan .................................. 58-137205
Aug. 19, 1983 [JP] Japan .................................. 58-151882
Sep. 1, 1983 [JP] Japan .................................. 58-160921

[51] Int. Cl.$^4$ .............................................. G01B 7/02
[52] U.S. Cl. .................................... 324/207; 324/260; 324/249; 324/252; 360/114
[58] Field of Search ............... 324/207, 208, 260, 261, 324/262, 225, 249, 252, 172; 360/114; 328/165; 250/237 G, 231 SE; 356/395; 33/125 C; 340/347 P

[56] References Cited
U.S. PATENT DOCUMENTS 3,626,397 12/1971 Uemura ................................ 324/208
4,309,702 1/1982 Mibu et al. ...................... 324/208 X

FOREIGN PATENT DOCUMENTS 137812 8/1982 Japan .................................. 324/207

Primary Examiner—Reinhard J. Eisenzopf
Assistant Examiner—Robert W. Mueller
Attorney, Agent, or Firm—Lewis H. Eslinger; Alvin Sinderbrand

[57] ABSTRACT

A detector head for use in a measuring device includes a plurality of constituent measuring elements arranged in at least two blocks, each block producing an output signal of equal amplitude, and a phase shifter provided to shift the relative phases of the output signals of the blocks to have a predetermined relative phase difference, whereby selected higher-order harmonic components are cancelled from the resultant signal formed by summing the signals produced by the separate blocks of constituent elements.

8 Claims, 42 Drawing Figures

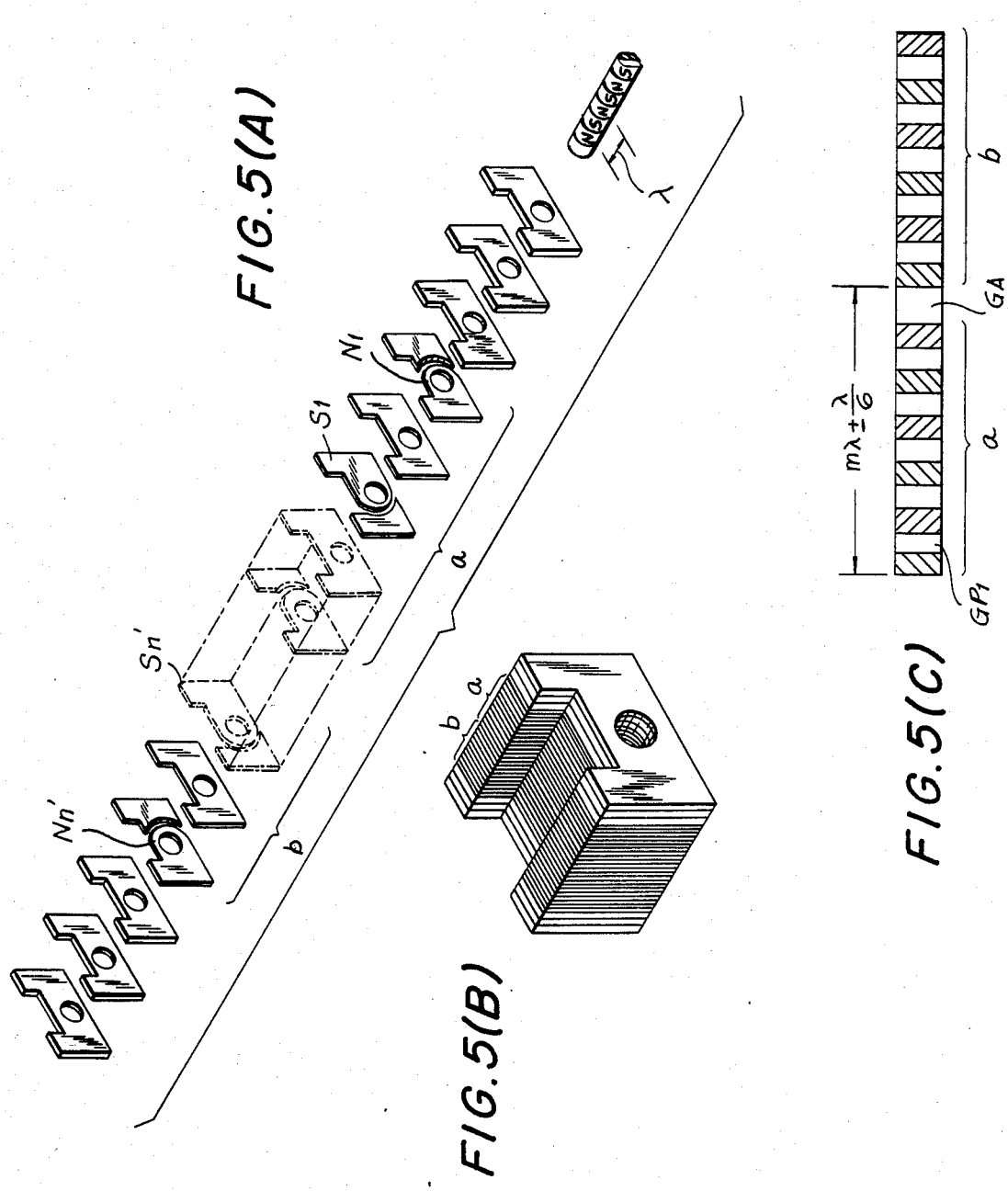

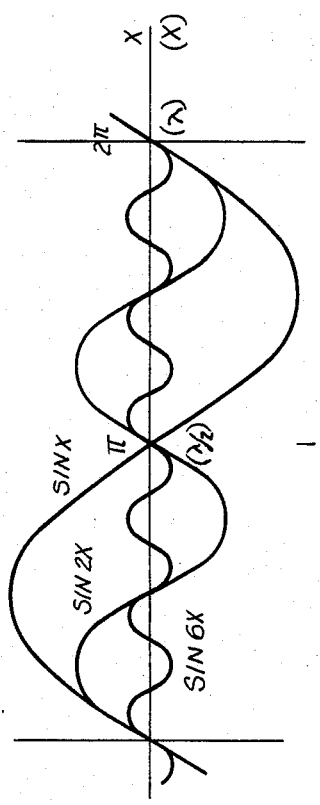
FIG.9(A)
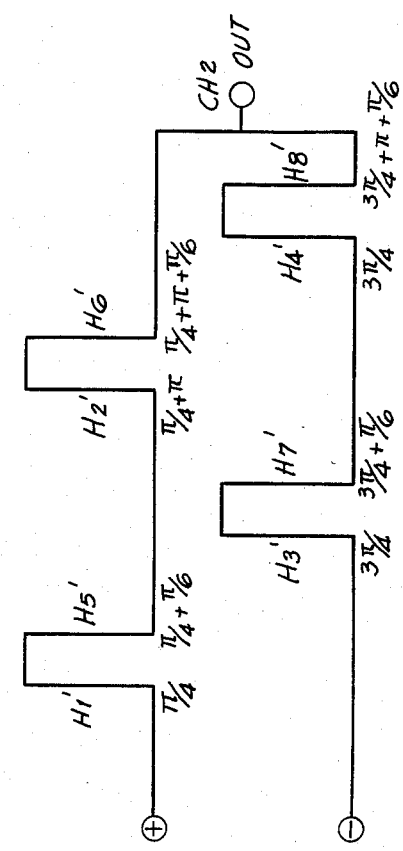
FIG.9(B)
FIG.9(C)

DETECTOR FOR USE FOR MEASURING DIMENSIONS OF AN OBJECT

BACKGROUND OF THE INVENTION

1. Field of the Invention

This invention relates to a detector head for obtaining scale signals from a measuring device using a magnetic or optical scaling device and, more particularly, to improvements in removing distortion in the scaling detector signals and for improving the precision of the measuring device.

2. Description of the Prior Art

As is known, there are measurement systems of various types, such as magnetic, optical, magnetic induction, and capacitance. All of these systems detect variations in magnetic flux, optical intensity, induced voltage, or electrostatic capacitance, corresponding to some displacement and transform the variations into electric signals by using a reference scale having a periodically varying pattern and a pickup head that undergoes the displacement.

In order to increase the resolving power, the detector output of these systems is often divided into a plurality of portions that are much smaller than the period of the pattern in the reference scale, so that precise positions of the pickup head can be obtained by the electrical division, that is, by interpolation. For this purpose, it is desirable that the waveform of the detector output be approximately sinusoidal, with distortion of the waveform being kept at a minimum. In the case where the waveform of the detector output is distorted, even if the electrical division (interpolation) is possible, high precision measurements cannot be obtained. Moreover, in the optical or capacitance kinds of systems, because the waveform of the detector output, which corresponds to variations in optical intensity or capacitance, is trapezoidal or triangular with respect to the mechanical displacement, it contains harmonic components, principally third order harmonic components.

This trapezoidal waveform can be represented by:

$$f_1(x) = \frac{4}{\pi} \frac{a}{b} \frac{1}{1^2} \left( \sin b \cdot \sin x + \frac{1}{3^2} \sin 3b \cdot \sin 3x \ldots \right) \quad (1)$$

and the triangular waveform by:

$$f_2(x) = \frac{2a}{\pi^2} \left( \frac{\sin x}{1^2} - \frac{\sin 3x}{3^2} + \frac{\sin 5x}{5^2} \ldots \right) \quad (2)$$

The distortion factor can be calculated by using the following formula:

$$\text{Distortion Factor} = \sqrt{\frac{\Sigma \, (\text{harmonic component})^2}{\text{fundamental component}}} \quad (3)$$

Thus, it can be seen that the major part of the distortion that is present can be attributed to third order harmonic components.

The above-described situation exists for a magnetic head, for example, in a phase-modulation type scaling device, in which a magnetic grating on a magnetic scale is read out by a multiple-gap head responsive to magnetic flux, as disclosed in Japanese provisional publication No. 137812/82. In such scaling device, scaling signals detected by a conventional multiple-gap head responsive to magnetic flux contain third order harmonic components in addition to the fundamental components, and this gives rise to the above-described drawbacks because interpolation errors are provoked by distortions due to these third order harmonic components. The present invention is based upon a study of the causes of these errors.

In order to improve the resolving power of a precision measuring system or a machine tool using the above-described scaling device, it is necessary to electrically interpolate for a distance equal to the pitch of the grating, however, for various reasons, in the course of this interpolation, interpolation errors are produced. The principal reasons are variations in the distance between the heads of the individual channels, direct current deviations in the reproduction output signal levels, variations in the amplitudes of the reproduced output signals, and distortions due to the third order harmonic components in the reproduction output.

In order to realize a high precision measurement, the interpolation errors should be suppressed and all errors, except for those due to the third order harmonic components, can be alleviated by electrical regulation. Distortion due to third order harmonic components are provoked in the electro-magnetic transformation system by various causes, such as noise in the electrical circuit and scale distortions, to name only a few, but the errors due to scale distortions are the most important. Consequently, interpolation errors can be reduced significantly by removing these scale distortions.

The interpolation errors due to third-order harmonic components can be calculated as follows. Supposing that the third order harmonic wave is $C_3$ times as large as the fundamental wave, then the output voltage e of a head can be represented by:

$$e_1 = \sin \omega_0 t \left( \cos \frac{2\pi}{\lambda} x + C_3 \cdot \cos \frac{2\pi}{\lambda} 3x \right) \quad (4)$$

$$e_2 = \cos \omega_0 t \left( \sin \frac{2\pi}{\lambda} x - C_3 \cdot \sin \frac{2\pi}{\lambda} 3x \right) \quad (5)$$

By assuming that $\omega_0 t = T$ and $$\frac{2\pi}{x} \lambda = X,$$

the following equation can be obtained:

$$e = e_1 - e_2 \quad (6)$$
$$= \sin T \{\cos X + C_3 \cdot \cos 3X\} - \cos T \{\sin X - C_3 \cdot \sin 3X\}$$

Assuming that $C_3 = 0$, equation (6) above can be simplified to:

$$e = \sin(T - X) \quad (7)$$

Consequently, when $T = X$, $e = 0$, that is, $X$ can be obtained by detecting the phase difference between the voltage represented by equation (7) and the reference wave $e = \sin T$.

Putting $T = X + \Delta X$, equation (6) can be transformed to:

$$e = \sin(X+\Delta X)\{\cos X + C_3 \cos 3X\} - \cos(X+\Delta X)\{\sin X - C_3 \sin 3X\} \qquad (8)$$

Assuming that $e=0$, $\Delta X$ remains an interpolation error and can be calculated as follows:

$$\Delta X = \tan^{-1}\left(-\frac{\sin X - C_3 \cdot \sin 3X}{\cos X + C_3 \cdot \cos 3X}\right) - X \qquad (9)$$

OBJECTS AND SUMMARY OF THE INVENTION

Accordingly, it an an object of this invention to provide a detector head in which deleterious harmonic waves are removed from the output, specifically, harmonic waves of the third order, which can cause distortions in the scaling detector signals or the output waves with respect to displacement of a transducer.

In accordance with an aspect of this invention, in a detector head consisting of a plurality of constituent elements, the pattern of said constituent elements is divided into at least two blocks that provide identical output signal amplitudes, and the blocks are so located that the phase difference between the signals coming from each of the blocks is equal to $\pi/\alpha\,(1+2n)$, where n is an integer. In this way, by combining the outputs of the blocks, an output having no harmonic components of $\alpha$th order can be obtained. In a core-type magnetic head, an air gap is so disposed that it has a length approximately equal to the wavelength of the harmonic component that is to be removed from the output of the head. In a head consisting of a plurality of ferromagnetic, metal-film element lines, the element lines are so disposed that the extent of the arrangement pattern of the element lines in one plane is approximately equal to the wavelength of the harmonic component that is to be removed from the output of the head.

In another aspect of the present invention, an optical scaling device is provided having a main scale, an index scale that is maintained parallel to the main scale, and a light receiver for detecting light which has passed through the two scales, in which a scale output responding to relative displacement of the two scales is obtained, corresponding to the pattern of the optical grating in the two scales, and the main scale or the index scale is provided with a plurality of optical grating patterns, which are so disposed that they have a predetermined spatial phase difference, so that predetermined harmonic components are removed from the resultant scale output signal as produced by appropriate light receivers.

The above and other objects, features, and advantages of the present invention will become apparent from the following detailed description of illustrative embodiments thereof to be read in conjunction with the following drawings.

BRIEF DESCRIPTION OF THE DRAWINGS

FIGS. 5(A), (B), and (C) schematically illustrate an embodiment of a magnetic detector head according to this invention;

FIGS. 9(A), (B), and (C) are a waveform diagram and schematic illustrations of metal-film element lines in a ferromagnetic detector head, respectively, according to another embodiment of this invention;

FIGS. 18 (A) and (B) schematically illustrates intercepting plates useful with optical scales in an optical scaling device according to this invention;

DETAILED DESCRIPTION OF PREFERRED EMBODIMENTS

Figure 1:
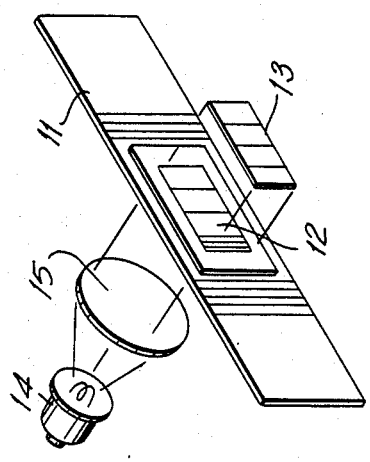
FIG. 1 schematically illustrates the basic construction of an optical scaling device with which the present invention is useful.

Referring now to FIG. 1, an optical-type detector system is shown in which the waveform of the detector output signal, which corresponds to variations in optical intensity, can be trapezoidal or triangular and will contain harmonic components, principally consisting of third order harmonics. The following discussion relative to this optical detector also applies to a capacitance-type detector head. The two waveforms $f_1(x)$ and $f_2(x)$ are represented in equations (1) and (2) above and are shown graphically in FIG. 2. This optical detector system will be described in more detail hereinbelow.

Figure 3:
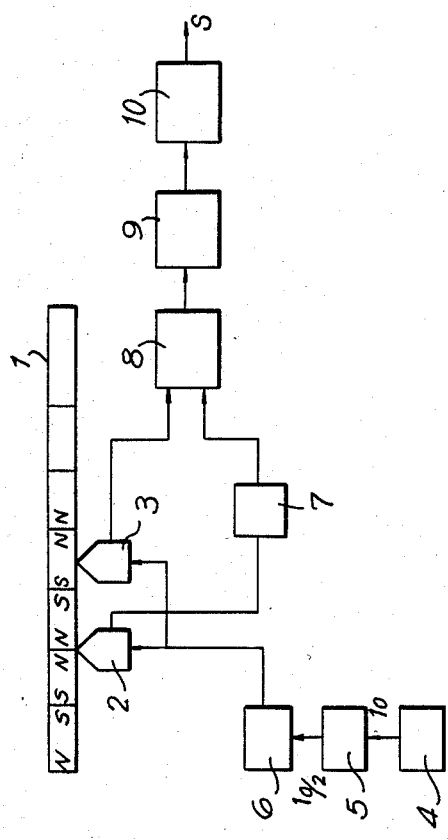
FIG. 3 is a block diagram illustrating the construction of a prior art phase modulation type magnetic scaling device.

In FIG. 3, a system device is represented using a known, phase-modulation-type magnetic scaling device is disclosed in Japanese published application No. 57-137812 and including magnetic scale 1 being scanned by first and second channel heads 2 and 3, respectively, which are multiple-gap heads responsive to magnetic flux. An output signal from oscillator 4 is divided down by frequency divider 5 and fed to magnetic exciter circuit 6 having an output excitation signal fed to multiple-gap heads 2 and 3. The output from head 2 is fed through phase-shift unit 7 as one input to mixer amplifier 8, and the output from head 3 is fed directly as the other input to mixer amplifier 8. The system output signal S is the output signal from mixer amplifier 8 after being fed through bandpass filter 9 and limiter amplifier 10.

The output signal $f_0$ of oscillator 4 is the reference signal, $\omega_0$ is the angular frequency of the oscillator output, $f_0/2$ is the output of the frequency dividing circuit, and $(m\pm\frac{1}{4})\lambda$ represents the distance between heads 2 and 3. Based on these values the following relations are obtained.

$$f_0 = \sin \omega_0 t \tag{10}$$

$$f_0/2 = \sin \omega_0 t/2, \tag{11}$$

When $\lambda$ represents the pitch of the grating in the index scale and x denotes the relative displacement between the index scale and the head, the output of the limiter-amplifier 10 (phase modulation signal) can be represented by:

$$S = \sin\left(\omega_0 t + \frac{2\pi}{\lambda} x\right) \tag{12}$$

A scaling signal f(x) detected by a multigap head responding to magnetic flux is composed of two detector signals $f(x_1)$ and $f(x_2)$.

$$f(x) = f(x_1) + f(x_2) \tag{13}$$

Supposing now that the detector signals $f(x_1)$ and $f(x_2)$ have an identical amplitude and a phase difference therebetween, they can be expressed by the following Fourier series.

$$f(x_1) = \frac{a_0}{2} + \sum_{n=1}^{\infty} (a_n \cdot \cos nx_1 + b_n \cdot \sin nx_1) \tag{14}$$

$$f(x_2) = \frac{a_0}{2} + \sum_{n=1}^{\infty} \left\{ a_n \cdot \cos n\left(x_1 + \frac{\pi}{\alpha}\right) + b_n \cdot \sin n\left(x_1 + \frac{\pi}{\alpha}\right) \right\} \tag{15}$$

Consequently, the scaling signal f(x) can be expressed as follows:

$$f(x) = f(x_1) + f(x_2) \tag{16}$$

$$= a_0 + \sum_{n=1}^{\infty} \left[ a_n\left\{ \cos nx_1 + \cos n\left(x_1 + \frac{\pi}{\alpha}\right)\right\} + b_n\left\{ \sin nx_1 + \sin n\left(x_1 + \frac{\pi}{\alpha}\right)\right\}\right]$$

When $n = \alpha$ the following two identical equations are valid.

$$a_\alpha\{\cos \alpha x_1 + \cos(\alpha x_1 + \pi)\} = 0 \text{ and}$$

$$b_\alpha\{\sin \alpha x_1 + \sin(\alpha x_1 + \pi)\} = 0 \tag{17}$$

That is, in this case, f(x) is represented by a function containing no harmonic components of the $\alpha$th order. In order to remove the harmonic components of the third order, it is sufficient to set $\alpha = 3$ and to combine the detector signals $f(x_1)$ and $f(x_2)$, which have a phase difference equal to $\pi/3$ therebetween, to obtain a scaling signal.

This principle can be applied to a multiple-gap head responsive to magnetic flux, for example, the pattern of the constituting elements of each of the two heads is divided into two blocks so that they produce outputs of identical amplitude having a phase difference therebetween, which is selected to be equal to $m\lambda \pm \lambda/6$ and the outputs $f(x_1)$ and $f(x_2)$ of the blocks are combined. In this way, distortions due to the harmonic components of the third order can be removed from the output of the head, which output is the desired scaling signal.

Figure 4:
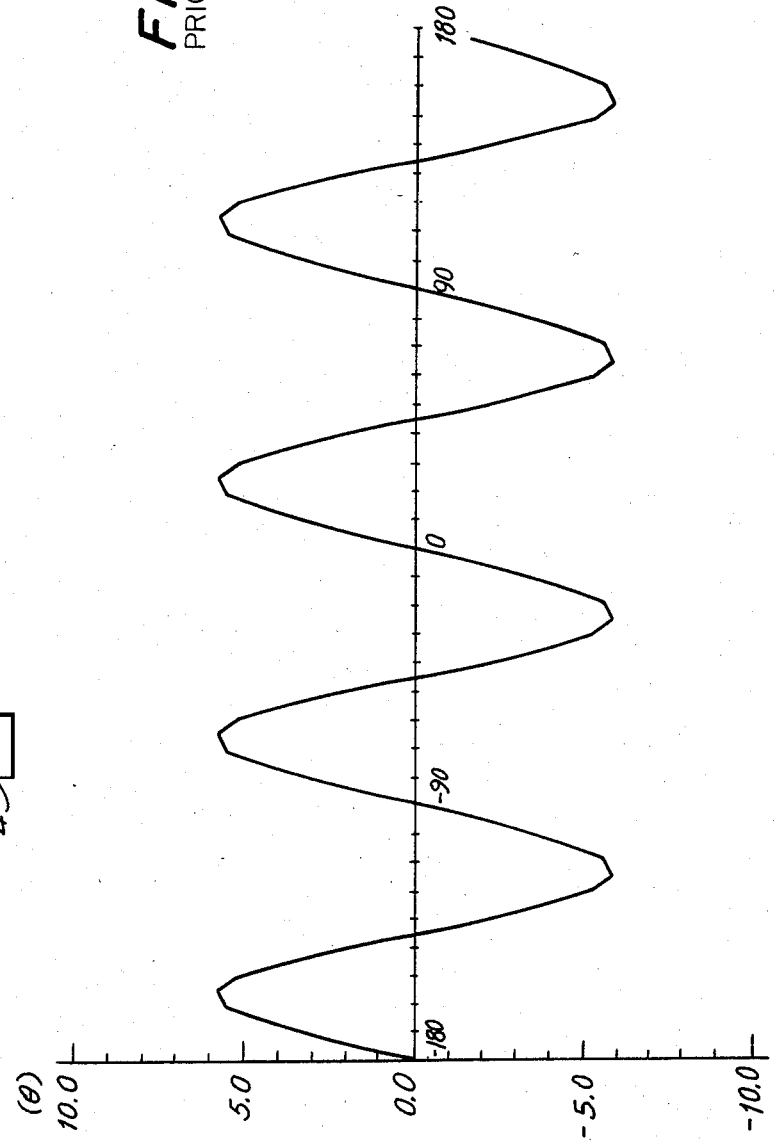
FIG. 4 is a graphical illustration showing interpolation errors present in the device of FIG. 3.

It should be recalled that in prior art systems such distortions typically arose in the interpolation operation that was performed in order to obtain more accurate measurements. FIG. 4 shows a graph of a computer simulation of this interpolation error and it is seen that the error has a frequency four times as high as that of the fundamental wave.

Figure 26:
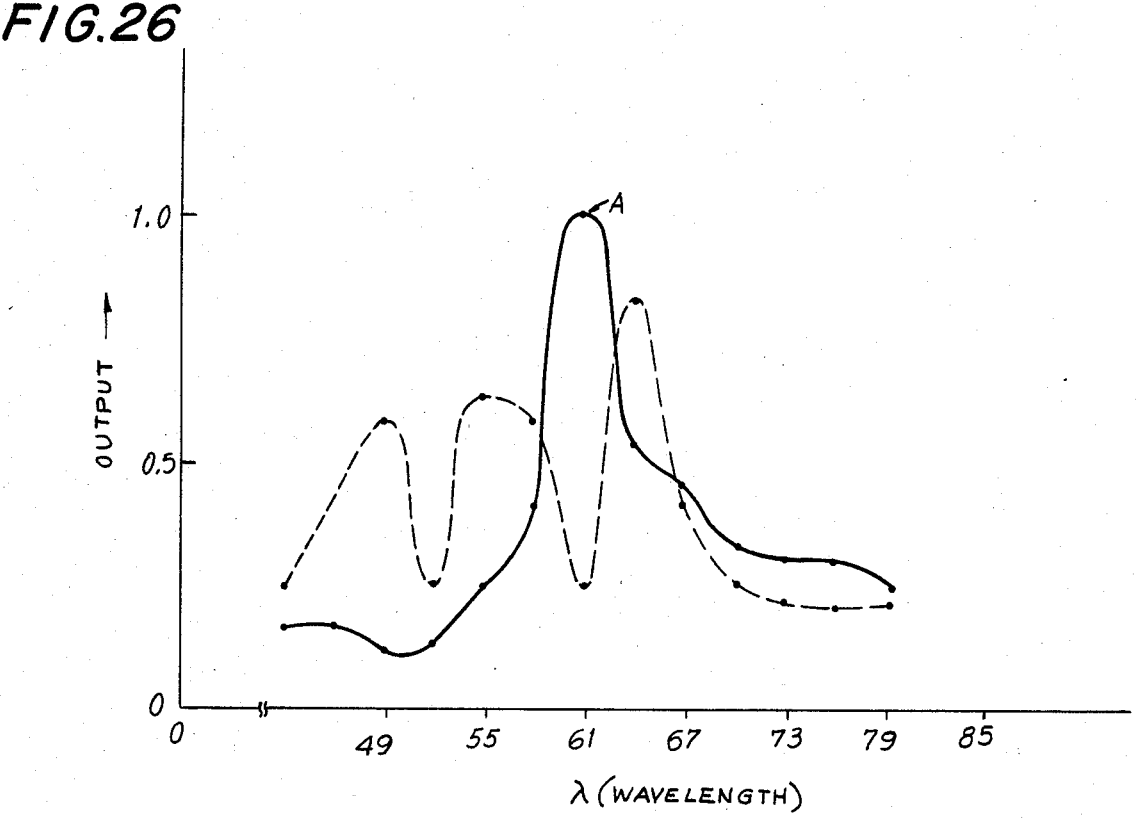
FIG. 26 is a graphical representation of the output of a detector head according to this invention and the output of a prior art head.

FIGS. 5(A), (B), and (C) represent an embodiment of a coaxial-type, multiple-gap head responding to magnetic flux constructed according to the above described principle, in which $N_n'$ ..., $S_1$ ... and $N_1'$ ... are laminate cores made of a high permeability material, such as permalloy, and between these laminate cores are inserted gap spacers $GP_1$. ..., made of non-magnetic material such as beryllium-copper. As indicated in these figures, the pattern of said cores is divided into two blocks a and b, with a spacer GA being inserted therebetween for phase regulation, so that they produce identical amplitude output signals having a relative phase difference equal to $m\lambda \pm \lambda/6$ therebetween. FIG. 26 shows the relation between the wavelength $\lambda$ and the relative output 0 of a head according to the above-described embodiment and the output of a conventional, prior art head. In FIG. 26, the solid line represents the characteristics of the head according to this invention and the broken line shows those of the conventional, prior art head. It is seen that distortions due to the third order harmonic components have been removed, as indicated for example at A.

Figures 6A, 6B:
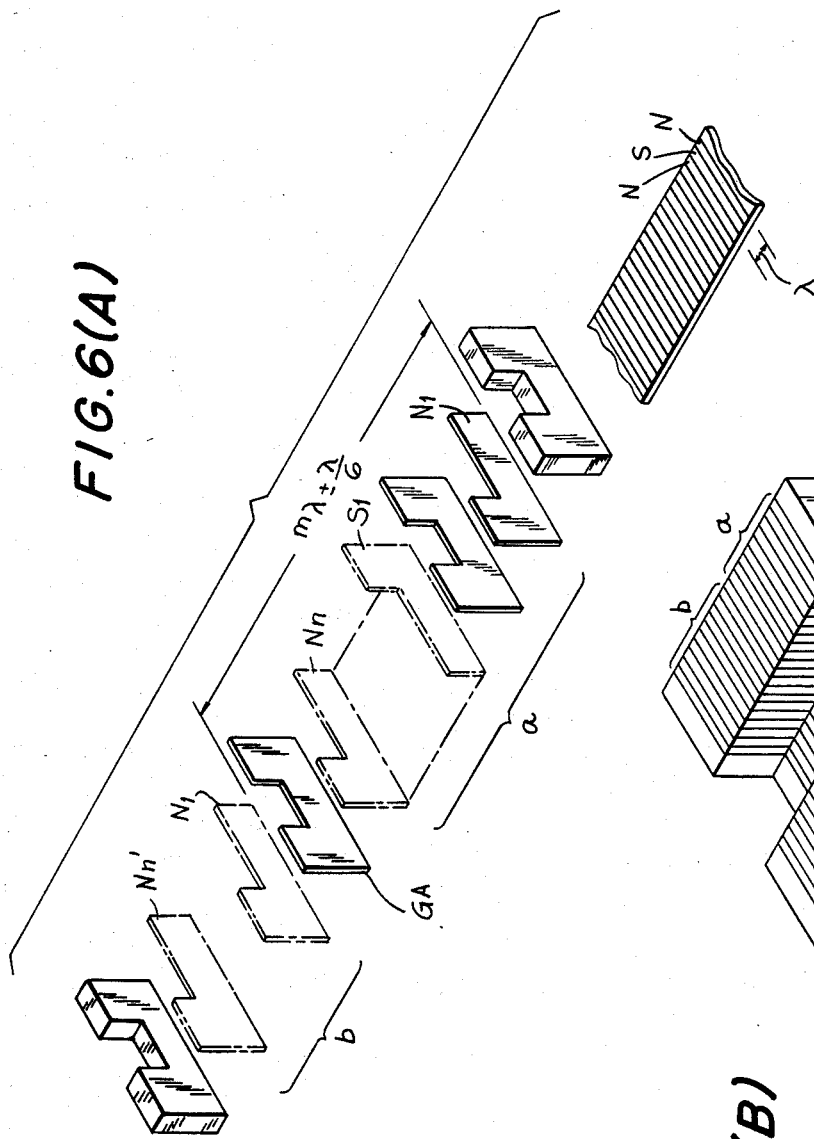
FIGS. 6(A) and (B) schematically illustrate another embodiment of a megnetic detector head according to this invention.
Figure 7:
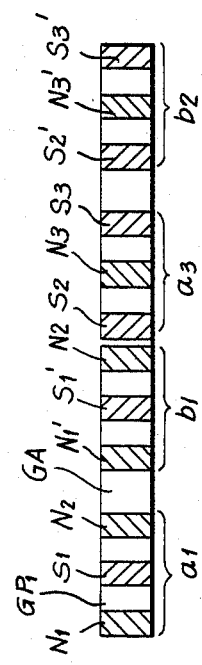
FIG. 7 schematically illustrates a block pattern of another embodiment of a magnetic detector head according to this invention.
Figure 8:
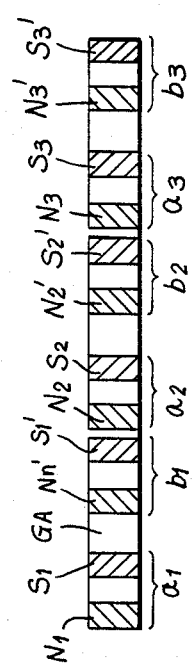
FIG. 8 schematically illustrates a block pattern of another embodiment of a magnetic detector head according to this invention.

FIGS. 6 (A) and (B) schematically illustrate a planar-type multiple-gap head of the kind responsive to magnetic flux according to this invention that is similar in construction to the embodiment described above. The division described above of the pattern of the constituent elements of each of the heads need not necessarily be into two, and the head can be divided into four blocks $a_1$, $a_2$, $b_1$ and $b_2$, or into six blocks $a_1 \ldots a_3$ and $b_1 \ldots b_3$, as indicated in FIGS. 7 and 8, respectively. In general, they can be divided into an arbitrary number of blocks.

Application of the present invention is not restricted to the multiple-gap head responsive to magnetic flux as described above, but it can be applied, for example, to a ferromagnetic, metal-film magnetic head utilizing the magneto-resistance effect. In FIGS. 9 (A), (B), and (C) $H_1$ to $H_8$ represent magneto-resistance element lines, connected in series, made of ferromagnetic metal film having anisotropic effect in magnetoresistance, which element lines form the first channel head. They are disposed on an insulating substrate (not shown) with a distance between adjacent element lines so that a predetermined phase relation with respect to the magnetic grating pattern of the magnetic scale is obtained. They are maintained to be parallel with a determined clearance to the magnetic grating pattern and a bias magnetic field applied in the direction of the element lines or magnetic anisotropy given in the direction of the element lines produces the same effect as the application of the bias magnetic field. $H_1'$ to $H_8'$ form the second channel head having the same construction as the first channel head described above.

The effective wavelength of the magnetic scale using said head is $\lambda/2$, $\lambda$ being the registered wavelength of the magnetic scale. Putting $(2\pi/\lambda) x = X$, being the relative displacement of the head with respect to the scale, the distance between the first channel head $CH_1$ and the second channel head $CH_2$ is equal to $(m \pm \frac{1}{4}) \lambda/2$. In each of the heads, element lines $H_5$ to $H_8$ and $H_5'$ to $H_8'$ are so disposed that they are displaced by $\lambda/6$ (1/6 of the effective wavelength) from the element lines $H_1$ to $H_4$ and $H_1'$ to $H_4'$, respectively.

When driving voltage $e_0 \sin T$ and $e_0 \cos T$ are applied to the first and the second channel heads, respectively, signals detected by the respective element line $e_1$ to $e_4$ can be represented as follows.

(i) $X$     (18)

$$e_1 = e_0(\alpha_1 \sin X + \sin 2X + \alpha_3 \sin 6X)\cos T +$$
$$e_0(\alpha_1 \cos X + \cos 2X + \alpha_3 \cos 6X)\sin T$$

(ii) $X \to X + \pi$     (19)

$$e_2 = e_0\{\alpha_1 \sin(X + \pi) + \sin 2(X + \pi) + \alpha_3 \sin 6(X + \pi)\}\cos T +$$
$$e_0\{\alpha_1 \cos(X + \pi) + \cos 2(X + \pi) + \alpha_3 \cos 6(X + \pi)\}\sin T$$
$$= e_0(-\alpha_1 \sin X + \sin 2X + \alpha_3 \sin 6X)\cos T +$$
$$e_0(-\alpha_1 \cos X + \cos 2X + \alpha_3 \cos 6X)\sin T$$

(iii) $X \to X + \frac{\pi}{6}$     (20)

$$e_3 = e_0\left\{ \alpha_1 \sin\left(X + \frac{\pi}{6}\right) + \sin 2\left(X + \frac{\pi}{6}\right) + \alpha_3 6\left(X + \frac{\pi}{6}\right) \right\} \cos T + e_0\left\{ \alpha_1 \cos\left(X + \frac{\pi}{6}\right) + \cos 2\left(X + \frac{\pi}{6}\right) + \alpha_3 6\left(X + \frac{\pi}{6}\right) \right\} \sin T$$

$$= e_0\left\{ \alpha_1 \sin\left(X + \frac{\pi}{6}\right) + \sin\left(2X + \frac{\pi}{3}\right) - \alpha_3 \sin 6X \right\} \cos T + e_0\left\{ \alpha_1 \cos\left(X + \frac{\pi}{6}\right) + \cos\left(2X + \frac{\pi}{3}\right) - \alpha_3 \sin 6X \right\} \sin T$$

(iv) $X \to X + \pi + \frac{\pi}{6}$     (21)

$$e_4 = e_0\left\{ \alpha_1 \sin\left(X + \pi + \frac{\pi}{6}\right) + \sin 2\left(X + \pi + \frac{\pi}{6}\right) + \alpha_3 6\left(X + \pi + \frac{\pi}{6}\right) \right\} \cos T + e_0\left\{ \alpha_1 \cos\left(X + \pi + \frac{\pi}{6}\right) + \cos 2\left(X + \pi + \frac{\pi}{6}\right) + \alpha_3 6\left(X + \pi + \frac{\pi}{6}\right) \right\} \sin T$$

$$= e_0\left\{ -\alpha_1 \sin\left(X + \frac{\pi}{6}\right) + \sin\left(2X + \frac{\pi}{3}\right) - \alpha_3 \sin 6X \right\} \cos T + e_0\left\{ -\alpha_1 \cos\left(X + \frac{\pi}{6}\right) + \cos\left(2X + \frac{\pi}{3}\right) - \alpha_3 \sin 6X \right\} \sin T$$

Consequently, the resultant output voltage E of the two heads indicated below is obtained.

$$E = e_1 + e_2 + e_3 + e_4 \quad (22)$$

-continued $$= 2e_0 \left\{ \sin 2X + \sin\left(2X + \frac{\pi}{3}\right) \right\} \cos T +$$

$$2e_0 \left\{ \cos 2X + \cos\left(2X + \frac{\pi}{3}\right) \right\} \sin T$$

$$= 2e_0 \sin\frac{1}{2}\left(4X + \frac{\pi}{3}\right) \cos\frac{\pi}{3} \cos T +$$

$$2e_0 \cos\frac{\pi}{2}\left(4x + \frac{\pi}{3}\right) \cos\frac{\pi}{3} \sin T$$

$$= \sqrt{3e_0} \sin\left(2X + \frac{\pi}{6} + T\right)$$

Thus, it is possible to obtain phase modulation signals consisting only of the effective wavelength and that contain no harmonic components of the third order of the registered wavelength and the effective wavelength.

The present invention can also be realized as an optical scaling device, as shown in FIG. 1, and referring thereto, in an optical scaling device if it is assumed that the duty cycle of main scale 11 and index scale 12 is 1:1, then scale output f(x) detected by light sensor 13 can be expressed by:

$$f(x) = \frac{A}{2} + \frac{4A}{\pi^2} + \left( \frac{\cos x}{1^2} + \frac{\cos 3x}{3^2} + \frac{\cos 5x}{5^2} \right) \ldots \quad (23)$$

Referring still to FIG. 1, illumination is provided by light source 14 passing through lens system 15. Duty cycle or ratio 1:1 in an optical grating means that the width of the transparent part and that of the intercepting part are equal, and the sum of the two is the grating constant.

Figure 2:
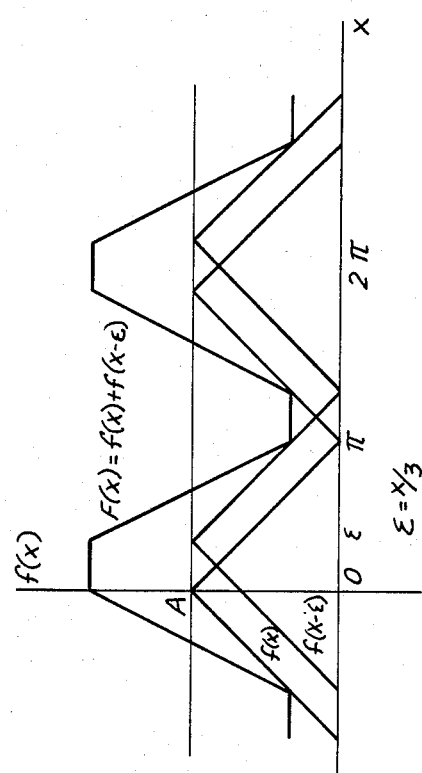
FIG. 2 is a graphical illustration of waveforms useful in explaining the working principle of an embodiment of the present invention, as applied to an optical scaling device.

The signal f(x) mentioned above has a triangular waveform, as indicated in FIG. 2. Consider now the resultant wave F(x) obtained by adding a second triangular wave f(x+ε) expressed by equation (24) below, which has a phase difference ε with respect to the first triangular wave.

$$f(x + \epsilon) = \frac{A}{2} + \frac{4A}{\pi^2}\left( \frac{\cos(x + \epsilon)}{1^2} + \right. \quad (24)$$

$$\left. \frac{\cos 3(x + \epsilon)}{3^2} + \frac{\cos 5(x + \epsilon)}{5^2} \ldots \right)$$

$$F(x) = f(x) + f(x + \epsilon) \quad (25)$$

$$= A + \frac{8A}{\pi^2}\left\{ \frac{1}{1^2} \cos\left(x + \frac{\epsilon}{2}\right) \cos\frac{\epsilon}{2} + \right.$$

$$\frac{1}{3^2} \cos\left(3x + \frac{3\epsilon}{2}\right) \cos\frac{3\epsilon}{2} +$$

$$\left. \frac{1}{5^2} \cos\left(5x + \frac{5\epsilon}{2}\right) \cos\frac{5}{2}\epsilon \ldots \right\}$$

The condition under which the harmonic components of third order in equation (25) are zero is as follows.

$$3\epsilon/2 = \pi/2, \quad \epsilon = \pi/3 \quad (26)$$

That is, when the second triangular wave f(x−π/3) having a phase difference of π/3 with respect to x is added to the first triangular f(x), the third order harmonic components compensate each other, and scale outputs having only small amounts of distortion are obtained. Thus, it is understood that following the teaching of the present invention the precision of the scaling device can be improved.

Figure 10:
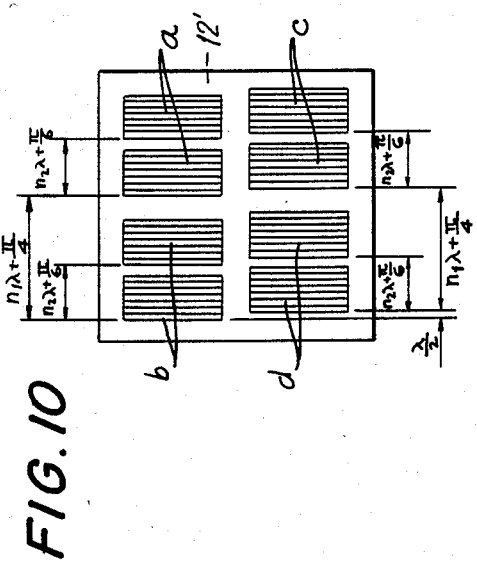
FIG. 10 schematically represents an embodiment of an optical index scale having a grating pattern according to this invention for use with an optical scaling device.
Figure 14:
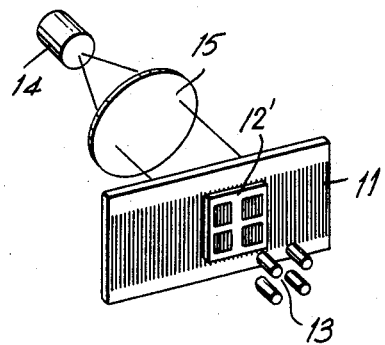
FIGS. 14 (A) and (B) schematically illustrate the basic construction of an optical scaling device having an index scale with grating pattern and another embodiment of an index scale with optical grating, respectively, according to this invention.
Figure 14:
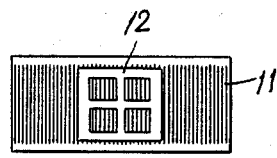

In FIG. 10 an embodiment of this invention based on the principle described above is shown in which $n_1$ to $n_4$ are arbitrary integers and in which index scale 12' is suitable for use in an optical scaling device, such as that shown in FIG. 14. Each of the four patterns a, b, c, and d in the index scale of FIG. 10 is divided longitudinally into two parts, and the two parts are so disposed that they produce a spatial phase difference equal to λ/6. In this way, for the reason mentioned above, the harmonic components of the third order are compensated.

Figure 11:
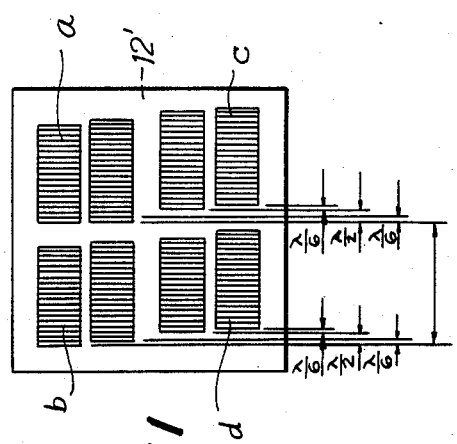
FIG. 11 schematically represents another embodiment of an optical index scale having a grating pattern according to this invention for use with an optical scaling device.

In the embodiment of FIG. 11, each of the patterns of index scale 12' is divided transversely into two parts. This division method in the main scale gives the same effect as described above.

Figure 12:
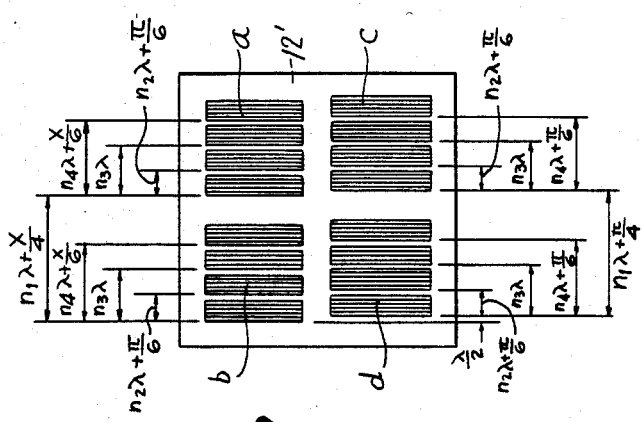
FIG. 12 schematically represents another embodiment of an optical index scale having a grating pattern according to this invention for use with an optical scaling device.

FIG. 12 shows another embodiment, in which each of the patterns of index scale 12' is divided into four parts, instead of two parts, as in the embodiments of FIGS. 10 and 11. By increasing the division number, the compensation of distortions due to the third order harmonic components is increased, because the difference in output due to different locations of the patterns is reduced.

Figure 13:
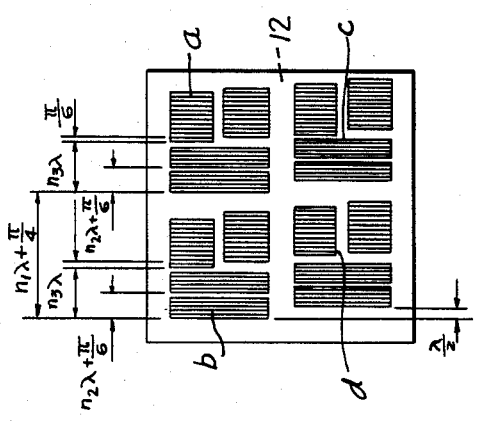
FIG. 13 schematically illustrates another embodiment of an optical index scale having a grating pattern according to this invention for use with an optical scaling device.

In the embodiment shown in FIG. 13 each of the patterns of index scale 12' is divided longitudinally, as well as transversely.

Figure 15:
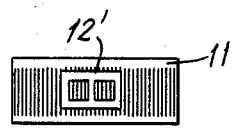
FIG. 15 schematically illustrates another embodiment of an optical index scale having a grating pattern according to this invention for use with an optical scaling device.
Figure 16:
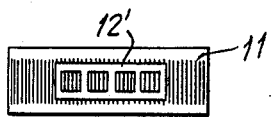
FIG. 16 schematically illustrates another embodiment of an optical index scale having a grating pattern according to this invention for use in an optical scaling device.

As mentioned above, by dividing each of the patterns of the index scale longitudinally and/or transversely at least into two parts and by disposing them so that they produce a spatial phase difference of λ/6 (λ is the wavelength), it is possible to remove the harmonic components of the third order from the scale output. The same effect can be obtained by dividing main scale 11 transversely. Furthermore, not only distortions due to the harmonic components of the third order but also other periodic distortions can be removed by displacing a part of each of the patterns of the index scale with respect to the other, so that a spatial phase difference of π is induced in the periods of distortions, as described above in relation to the various embodiments of the present invention. It is also possible to remove distortions by the same method as that disclosed in the preceding embodiments in the case where the patterns of the index scale 12' are arranged as shown in FIGS. 15 and 16.

Figure 17A:
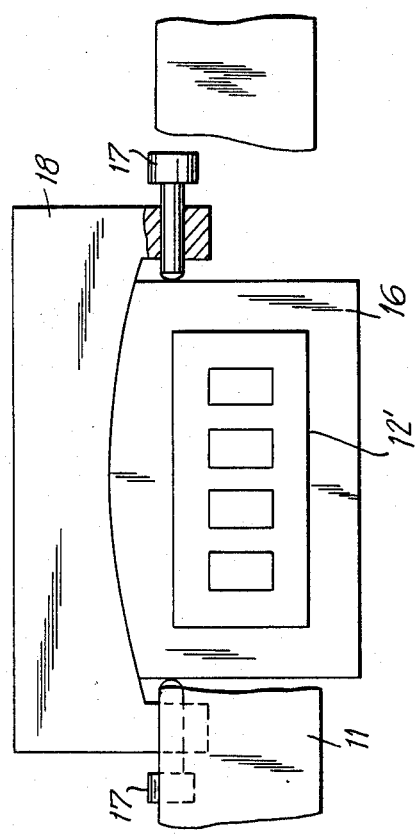
FIGS. 17 (A) and (B) schematically illustrate another embodiment of this invention as applied to an optical scaling device.
Figure 17B:
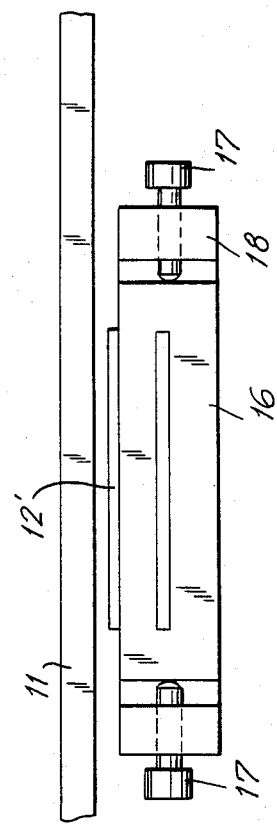

FIGS. 17(A) and (B) illustrate another embodiment, in which this invention is applied to an optical scaling device similar to that shown in FIG. 1, in which holder 16 retains index scale 12', and which is secured to fixed frame 18 through fine regulation adjustment mechanism 17, shown here as micrometer adjusters. Main scale 11 is displaced horizontally left and right in this embodiment, while being maintained parallel to, and at a certain distance from, index scale 12'. The light-sensor (not identified here but shown at 13 in FIGS. 1 and 14) is arranged parallel to main scale 11 and divided also into a plurality of parts, which correspond approximately to the parts of each of the patterns of the index scale.

Figures 18A, 18B, 20:
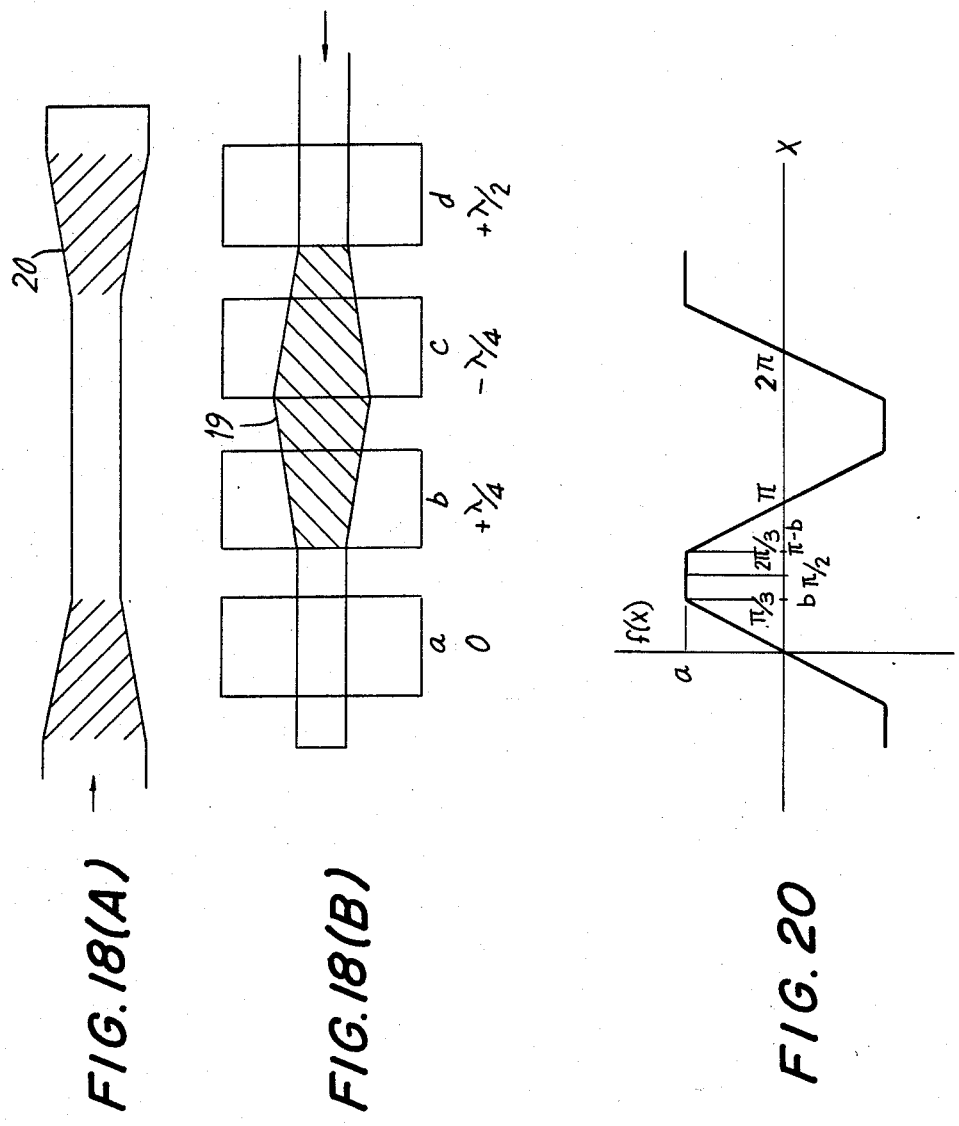
FIG. 20 is a waveform diagram useful in explaining the operation of an optical scaling device according to this invention.

As indicated in FIG. 18B, each of the patterns a and b of index scale 12' are divided by first intercepting plate 19 into two parts, upper and lower. The first intercepting plate is wider at the central hatched portion than at the ends. By displacing this intercepting plate 19 left and right for fine regulation, it is possible to balance light intensities passing through the patterns b and c. A second intercepting plate 20 shown in FIG. 18A is superposed on the first intercepting plate 19 and divides the patterns a and b into two parts, upper and lower, and at the same time balances light intensities passing through the patterns a and d.

Figure 19:
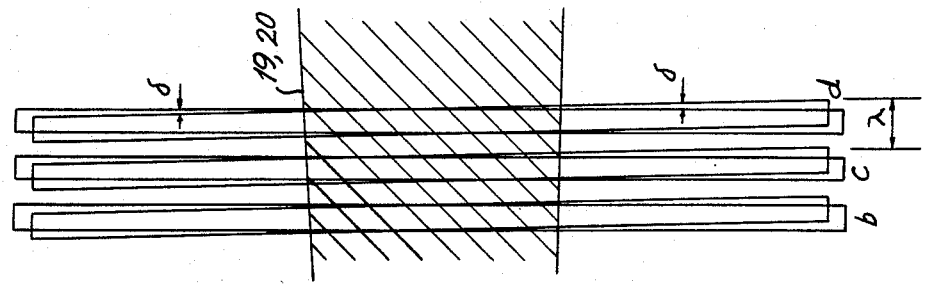
FIG. 19 schematically illustrates the relationship between an index scale and a main scale of an optical scaling device according to this invention.

Index scale 12' is so disposed that it is slightly inclined with respect to main scale 11, and this relation is indicated in FIG. 19, and they are so finely regulated that the upper and lower parts divided by intercepting plates (the central hatched parts) 19 and 20 produce a phase difference of $\lambda/6$. For this purpose, holder 16 of the index scale 12' is so constructed that it touches fixed frame 18 at a point along a great circle R (not shown) and can be fixed after having been slightly displaced horizontally. In this way, it is easy to regulate finely the angular direction of the index scale mentioned above by relatively large rotation of the fine regulation device or mechanism 17.

By utilizing this construction described above, since each of the patterns of index scale 12' is divided by the intercepting plates into two parts, upper and lower, and because respective light fluxes correspond to previously mentioned f(x) and f(x−π/3), when the two light fluxes are received by one light sensor, it is possible to obtain a resultant output F(x) from f(x) and f(x−π/3).

Furthermore, besides the method of composing two outputs as in the preceding embodiments, it is possible to obtain the same effect by using a specified construction of the scale patterns. That is, supposing that the output of the scale has a trapezoidal waveform, as shown in FIG. 20, the fundamental equation for the waveform is given by the following formulae.

$$f_0(x) = \frac{ax}{b} \quad (a \leq x \leq b) \tag{27}$$

$$= a \left( b \leq x \leq \frac{\pi}{2} \right)$$

$$f_0(x) = \frac{4a}{\pi b} \left( \frac{\sin b \sin x}{1^2} + \frac{\sin 3b \sin 3x}{3^2} + \frac{\sin 5b \sin 5x}{5^2} \cdots \right)$$

Putting b=/3 equation (27) can be transformed as follows:

$$f_0(x) = \frac{4}{\pi} \frac{a}{\frac{\pi}{3}} \frac{1}{1^2} \left( \sin\frac{\pi}{3} \sin x + \frac{1}{3^2} \sin 3\frac{\pi}{3} \sin 3x + \frac{1}{5^2} \sin 5\frac{\pi}{3} \sin 5x \cdots \right) \tag{28}$$

$$= \frac{12a}{\pi^2} \left( \frac{\sqrt{3}}{2} \sin x - \frac{1}{5^2} \frac{\sqrt{3}}{2} \sin 5x + \cdots \right) =$$

$$\frac{6\sqrt{3}a}{\pi^2} \sin x - \frac{\sin 5x}{5^2} \cdots )$$

As can be seen in equation (28), the harmonic components of the third order can be removed if the scale has an optical grating pattern that is so constructed that the waveform of the scale output is trapezoidal with b=π/3. For example, when the duty cycle of the optical grating pattern for one of the main scale and the index scale is 1:1, the duty cycle for the other should be 1:2 (1 represents the transparent part).

Figure 21:
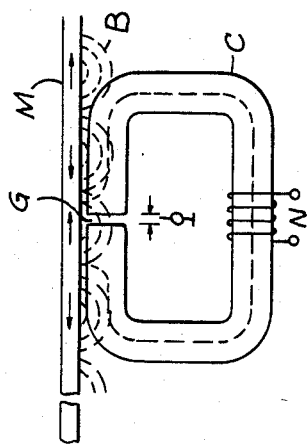
FIG. 21 schematically illustrates a prior art core-type magnetic detector head.

The object of this invention mentioned above can be employed with the known detector head construction as shown in FIG. 21, in which a core-type magnetic head touches memory medium M such as a magnetic scale through a gap G (head air gap) disposed in the core C, detects leakage magnetic flux B from said medium, and produces a reproduction output signal in the coil N.

Figure 22:
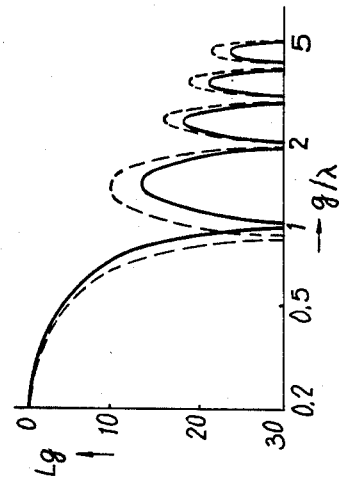
FIG. 22 is a graphical representation of the relation between loss in reproduction output and the air-gap width for the magnetic head shown in FIG. 21.

In this case, it is known that influences of the head air gap can be represented by:

$$\frac{\sin(\pi g/\lambda)}{\pi g/\lambda} \tag{29}$$

in which g denotes the width of the gap G and λ represents the registered wavelength (pitch of the magnetic grating). This is called air gap loss. The relation between g/λ and the reproduction output loss Lg is:

$$Lg = -20 \cdot \log_{10}\left\{ \frac{\sin(\pi g/\lambda)}{\pi g/\lambda} \right\} \text{ [dB]} \tag{30}$$

and is indicated by the solid line in FIG. 22. As clearly seen in FIG. 22, the loss Lg is maximum at g/λ=1, 2, 3, ... and, therefore, the output is minimum.

Consequently, in order to remove the third order harmonic components that cause interpolation errors from the head reproduction output according to the theory explained above, it is sufficient to put [g/(λ/3)]=1 that is, to design the air gap g so that its width is equal to the wavelength of the harmonic components of the third order that are to be removed. When the head air gap is so designed, the output loss is maximum and, thus, the harmonic components of the third order (λ/3) are minimized in the output detected by the head from the medium, in which the registered wavelength is λ.

It should be understood that the method described above can be applied for the purpose of removing other harmonic components. Furthermore, the width of the head air gap is not necessarily absolutely equal to the wavelength of the harmonic components that are to be removed, but it is sufficient to design the head air gap so that they are approximately equal. That is, in an area head, distribution of magnetix flux in the interior of the magnetic core varies because of variations in the neighborhood of the air gap fringe and the effective air gap width ge is slightly greater than the geometrical width.

This is indicated by the broken line in the graph of FIG. 22. Experimentally it is reported that ge=1.15 g. Consequently, it is possible to obtain better results by finely regulating the head air gap in practice, referring to measured values.

Figures 23A, 23B:
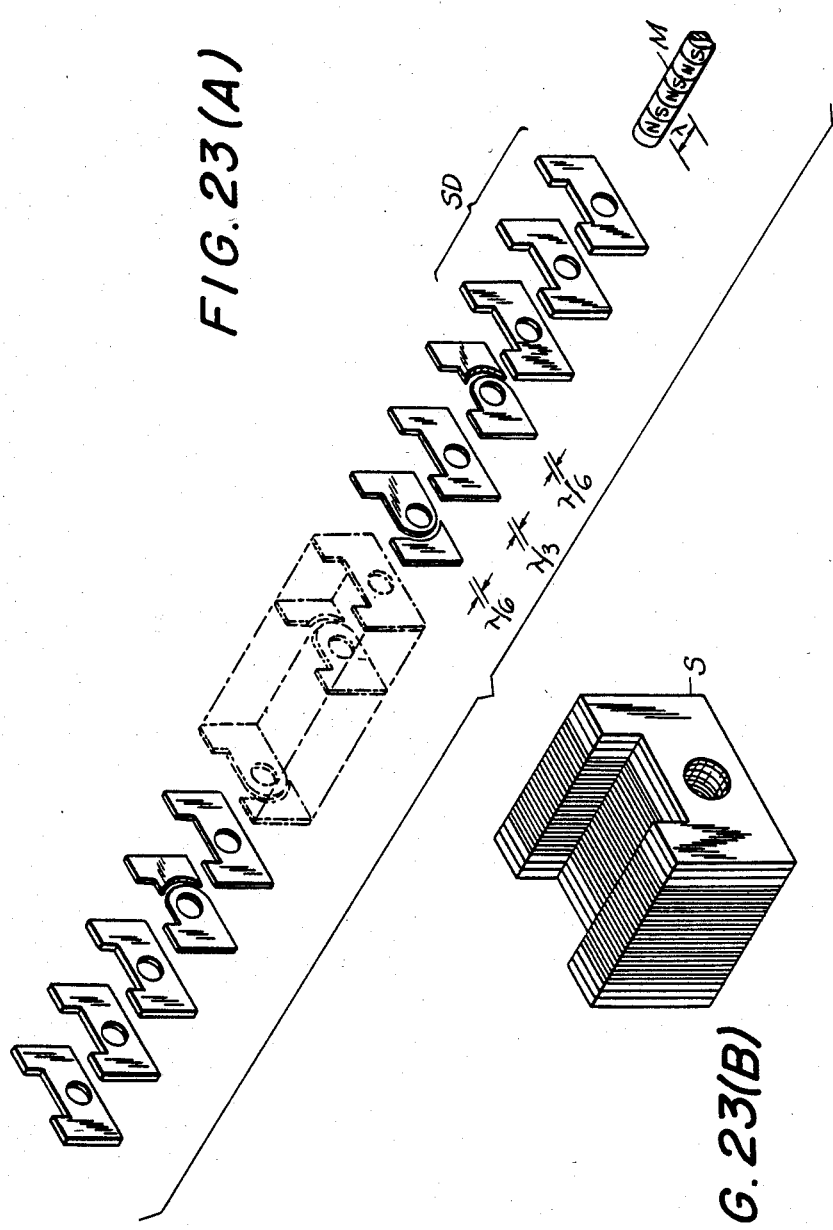
FIGS. 23 (A) and (B) schematically illustrate another embodiment of a core-type magnetic detector head according to this invention.
Figure 24A:
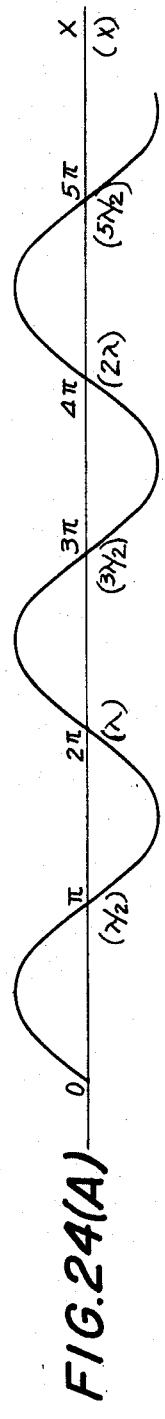
FIGS. 24 (A), (B), (C), and (D) are a waveform diagram and schematic illustrations of metal-film element lines in a ferromagnetic detector head, respectively, according to another embodiment of this invention.
Figure 24B:
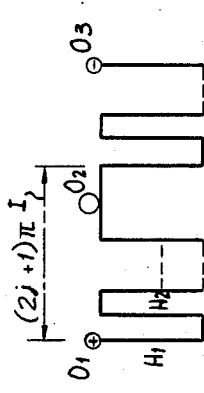
Figure 24C:
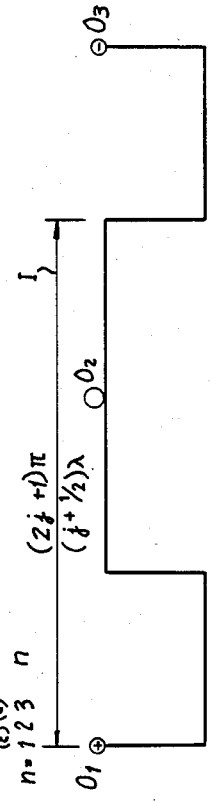
Figure 24D:
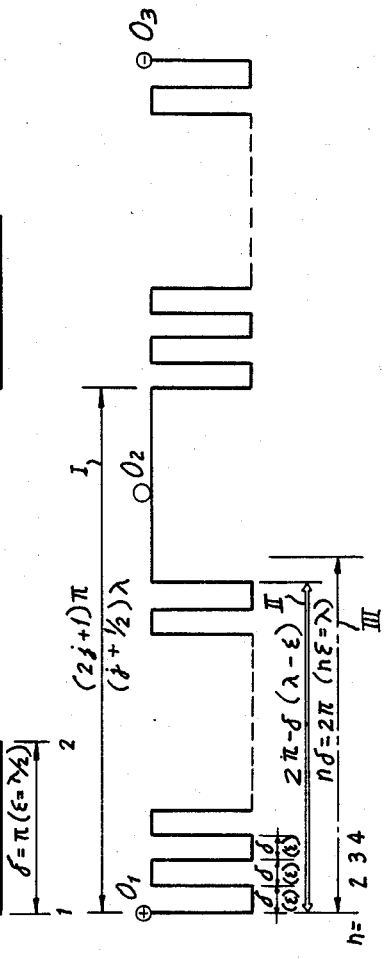
Figure 25A:
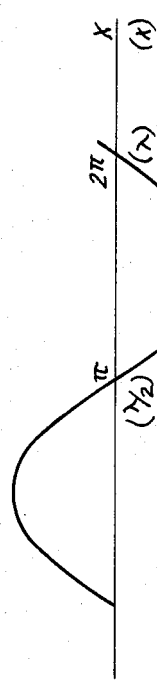
FIG. 25 is a waveform diagram and schematic illustrations of metal-film element lines in a ferromagnetic detector head, respectively, according to another embodiment of this invention.
Figure 25B:
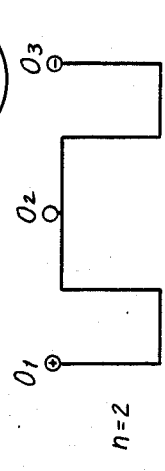
Figure 25C:
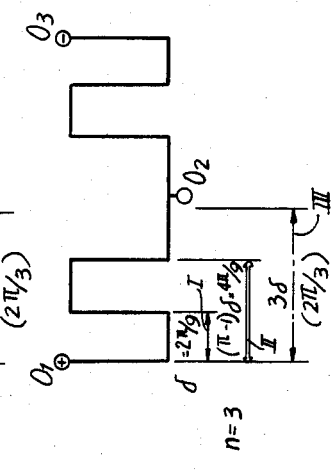
Figure 25D:
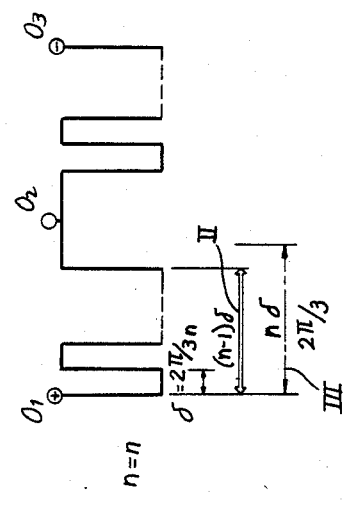

FIGS. 23 (A) and (B) show an embodiment in which the invention described above is applied to a coaxial-type multiple-gap head that is responsive to magnetic flux. In this embodiment, a gap spacer for determining the width of the head air gap is inserted between the cores A and B, so that a magnetic path is formed therebetween, and a plurality of them are superposed on each other together with end spacers SD, so that all of them together constitute head signal block S. The thickness of gap spacer G has been fixed at $\lambda/3$, in order to remove the harmonic components of the third order as described above, and the thickness of each core is $\lambda/6$. As a result, the harmonic components of the third order are greatly reduced. A through-hole is provided for magnetic scale M and because the other exciter core blocks, coils, etc. are identical to those of the prior art, they are omitted from this figure in the interest of clarity and brevity.

Figure 27:
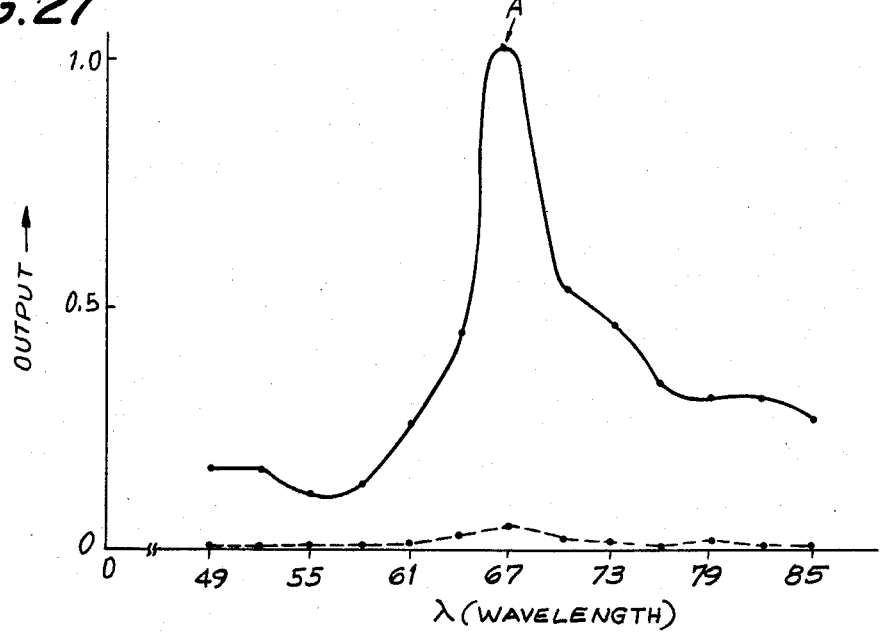
FIG. 27 is a graphical representation of the output of a detector head according to this invention and the output of a prior art head.

FIG. 27 shows the relation between the wavelength and the relative output 0 for the head in the embodiment described above and for a prior art head. In this figure the broken line represents characteristics of the head according to this invention and the solid line shows those of the prior art head. It is seen that the harmonic components of the third order are largely reduced, as shown for example at A.

This invention can be applied not only to a core-type magnetic head but also to a ferromagnetic metal-film magnetic head that uses the magneto-resistance effect.

FIGS. 24 (B)–(D) show an embodiment in which this invention is applied to a metal film magnetic head, in which $H_1, H_2, \ldots$ represent magneto-resistance element lines, connected in series, made of ferromagnetic metal film having anisotropic effect in magneto-resistance, which element lines form the first channel head. They are disposed on an insulating substrate (not shown) with a distance between adjacent element lines so that a predetermined phase relation with respect to the magnetic grating pattern of the magnetic scale is obtained. They are maintained to be parallel, with a predetermined clearance, to the magnetic grating pattern and a bias magnetic field is applied in the direction of the element lines, or magnetic anisotropy present in the direction of the element lines produces the same effect as the application of the bias magnetic field.

In the head of FIGS. 24 (B)–(D), assuming that the width of the element lines is negligibly small, the distance between adjacent element lines is equal to $\delta$, the effective wavelength of the scale is $\lambda$, then where the head mentioned above is of the planar-opposing type, and the magnetic field is perpendicular to the signal magnetic field (parallel to the element lines), the effective wavelength is equal to one half of the registered wavelength. For this head, two parallel element lines $H_1, H_2 \ldots$ are connected in series with a distance of $\lambda/2$, a constant voltage $e_0$ is applied to the terminal 0 and $O_3$ at the two ends, and the output is obtained at the intermediate terminal $O_2$. The output of this head can be expressed by $$E_1 = e_0 \sin X \tag{31}$$

where $X = 2\pi/\lambda x$.

When n element lines are arranged with a distance $\delta$, the output E can be represented as follows:

$$E = \frac{1}{n} \sum_{\lambda=1}^{n} e_0 \sin\{X + (\lambda - 1)\delta\} \tag{32}$$

$$= \frac{e_0}{n} \sin\left(X + \frac{(n-1)}{2}\delta\right) \frac{\sin n\delta/2}{\sin \delta/2}$$

$$= e_0 \frac{\sin n\delta/2}{n\sin \delta/2} \sin\left(X + \frac{(n-1)}{2}\delta\right)$$

When equations (31) and (32) are compared with each other, it is understood that the phase in the output E is shifted by $[(n-1)/2]\delta$ and that the amplitude $e_0$ is multiplied by $(\sin n \delta/2)/(n \sin \delta/2)$. That is, the amplitude is represented by:

$$e_0 \frac{\sin \frac{n\delta}{2}}{n \sin \frac{\delta}{2}} = e_0 \frac{\sin \frac{n\delta}{2}}{\frac{2}{\delta} \cdot \frac{n\delta}{2} \sin \frac{\delta}{2}} \tag{33}$$

$$= e_0 \frac{\frac{\delta}{2}}{\sin \frac{\delta}{2}} \cdot \frac{\sin \frac{n\delta}{2}}{\frac{n\delta}{2}}$$

In equation (33), putting n $\delta/2 = \Sigma$, $(\sin n \delta/2)/(n \delta/2)$ can be expressed by $\sin \Sigma/\Sigma$. Consequently, it can be seen that the same relation as that in the case of the core-type head is valid.

Putting n $\delta = \phi$, $\phi$ corresponds to the gap width of a core type head. Further, since $\phi$ is expressed in radians, $\phi$ can be approximated by a length and a relation $x = (\lambda/2\pi)\phi$ is obtained. If the pattern of element lines is so designed that its extent is equal to $x = \lambda/3$, it is possible to suppress substantially the harmonic components of the third order ($\lambda/3$) of the effective wavelength $\lambda$.

In the embodiment of FIGS. 25, (B), (C), and (D) a general element line arrangement pattern, and element line arrangement pattern, for which the output is zero for n=2, and an element line arrangement pattern, for which the output is zero for n=n are shown, respectively. I denotes the distance between adjacent element lines, II the extent of the element line arrangement pattern, and III the theoretical extent of the element line arrangement pattern.

In order to study the influences of the harmonic components of the third order more in detail, output E of the head is written as follows:

$$E = e (\sin X + \alpha \sin 3X) \tag{34}$$

When n element lines are so arranged that this distance between adjacent element lines is equal to $\delta$, the output E can be represented by the following equation.

$$E = \frac{1}{n}\left[\sum_{\lambda=1}^{n} e_0 \sin\{X + (\lambda - 1)\delta\} + \sum_{\lambda=1}^{n} \alpha e_0 \sin 3\{X + (\lambda - 1)\delta\}\right] \tag{35}$$

$$= \frac{e_0}{n} \sin\left\{ X + \frac{(n-1)}{2}\delta \right\} \frac{\sin\frac{n\delta}{2}}{\sin\frac{\delta}{2}} +$$

$$\frac{ae_0}{n} \sin\left\{ 3X + \frac{3(n-1)\delta}{2} \right\} \frac{\sin\frac{3n\delta}{2}}{\sin\frac{\delta}{2}}$$

In this equation, in order for the terminal to contain the harmonic components of third order, it is sufficient that sin $(3n\delta/2)/n$ sin $(\delta/2)$ equal zero. That is, $3n\delta/2 = \pi$, from which $n\delta = 2\pi/3$.

This condition is identical to that described previously and will be more concretely explained referring to FIG. 25, in which it is assumed that the element line arrangement pattern has some finite extent. The minimum extent is obtained for n=2. This extent corresponds to $n\delta = 2\delta = 2\pi/3$, that is, $\delta = \pi/3$, and it consists of two element lines with a distance of $\pi/3$, that is, $\lambda/6$. In this case the theoretical extent is $2x \cdot \pi/3 = 2\pi/3$ and the real extent is $(2-1) \times \pi/3 = \pi/3$.

Next when n=3, the extent of the pattern is $n\delta = 3\delta = 2\pi/3$. That is, $\delta = 2\pi/9$ and, therefore, the pattern consists of three element lines with a distance of $2\pi/9$. The theoretical extent is $3 \times 2/9\pi = 2/3\pi$ and the real extent $(3-1) \times 2/9\pi = 4/9\pi$. In general, for n element lines, the theoretical extent is $n\delta = 2/3\pi$. That is, for a pattern where n element lines are arranged parallel with a distance of $2\pi/3n$, the output loss of the harmonic components of third order in maximum. In this case, the theoretical extent of the pattern is $n\delta (=2/3\pi)$ and the real extent is $(n-1)\delta$, that is, $(2\pi/3)(n-1/n)$.

As explained above, according to this invention, since harmonic components especially those of the third order are removed from the detected scale signals, interpolation errors can be largely reduced.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A detector head for use in detecting dimensions of an object that is being measured and that is disposed adjacent to said detector head, said detector head comprising:

first and second sensor means for respectively producing first and second electrical signals indicating the dimensions of said object;

said first and second sensor means including a plurality of constituent elements forming a pattern arranged in at least two blocks;

said first and second electrical signals having equal amplitude and said blocks being disposed so that said first and second electrical signals have a relative spatial phase difference therebetween; and combining means for combining the output signals from said sensor means and producing a resultant sum signal wherein third-order harmonic components are cancelled.

2. A detector head according to claim 1, in which each of said sensor means comprises a multiple-gap magnetic transducer head responsive to magnetic flux.

3. A detector head according to claim 2, in which said multiple-gap magnetic transducer head comprises a core-type magnetic head, including an air gap having a length substantially equal to a wavelength of the harmonic component being cancelled from said resultant sum signal.

4. A detector head according to claim 1, in which each of said sensor means comprises ferromagnetic metal films arranged on a substrate and exhibiting anisotropy in magnetoresistance.

5. A detector head according to claim 4, in which said sensor means comprising said ferrormagnetic films include magnetic metal film element lines arranged in a pattern whereby the element lines in one plane are approximately equal to the wavelength of the harmonic component cancelled from the resultant sum signal.

6. A detector head according to claim 1, further comprising a reference scaling device for scaling the output signals produced by said sensor means.

7. A detector head according to claim 6, in which said reference scaling device comprises an optical scaling device having a main scale, an index scale arranged parallel to said main scale, and light receiving means for detecting light passed by said main scale and said index scale, in which scale output in response to relative displacement of said main and index scales corresponds to optical grating formed thereon, said main scale and said index scale including a plurality of optical grating patterns so formed to have a predetermined relative spatial phase difference, whereby said harmonic components are cancelled from the resultant sum signals.

8. A detector head according to claim 7, in which said predetermined relative phase difference is selected as 1/6 of the wavelength of the light.

* * * * *